(12) United States Patent
Roh et al.

(10) Patent No.: US 8,599,760 B2
(45) Date of Patent: Dec. 3, 2013

(54) ERROR PROPAGATION PROTECTION IN NON-BINARY MULTIPLE ACK/NACKS

(75) Inventors: Dongwook Roh, San Diego, CA (US);
Joonkui Ahn, Gyeonggi-Do (KR);
Mingyu Kim, Gyeonggi-Do (KR);
Daewon Lee, Gyeonggi-Do (KR);
Suckchel Yang, Gyeonggi-Do (KR);
Kijun Kim, Gyeonggi-Do (KR);
Dongyoun Seo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 187 days.

(21) Appl. No.: 13/102,603

(22) Filed: May 6, 2011

(65) Prior Publication Data

US 2011/0274023 A1  Nov. 10, 2011

Related U.S. Application Data

(60) Provisional application No. 61/332,757, filed on May 8, 2010.

(51) Int. Cl.
    *H04W 4/00*      (2009.01)
(52) U.S. Cl.
    USPC ............................................................ 370/328
(58) Field of Classification Search
    None
    See application file for complete search history.

(56) References Cited

U.S. PATENT DOCUMENTS

| | | | |
|---|---|---|---|
| 2009/0129259 A1 | 5/2009 | Malladi et al. | |
| 2009/0129317 A1* | 5/2009 | Che et al. | 370/328 |
| 2009/0141690 A1* | 6/2009 | Fan et al. | 370/335 |
| 2009/0175214 A1* | 7/2009 | Sfar et al. | 370/315 |
| 2009/0245212 A1* | 10/2009 | Sambhwani et al. | 370/336 |
| 2010/0074120 A1 | 3/2010 | Bergman et al. | |
| 2010/0272048 A1* | 10/2010 | Pan et al. | 370/329 |
| 2011/0085511 A1* | 4/2011 | Fan et al. | 370/329 |
| 2011/0087945 A1* | 4/2011 | Fan et al. | 714/750 |
| 2011/0249604 A1* | 10/2011 | Bharadwaj et al. | 370/311 |
| 2011/0267995 A1* | 11/2011 | Li et al. | 370/280 |
| 2011/0268045 A1* | 11/2011 | Heo et al. | 370/329 |
| 2012/0008585 A1* | 1/2012 | Kwon et al. | 370/329 |

\* cited by examiner

*Primary Examiner* — Otis L Thompson, Jr.
(74) *Attorney, Agent, or Firm* — Birch, Stewart, Kolasch & Birch, LLP

(57) ABSTRACT

A scheme of error decoupling for carrier aggregation techniques to support a communication system is provided. The communication system operates with up to 2 codewords for up to 5 carriers, each codeword of each carrier having one acknowledgement/negative acknowledgement (ACK/NACK) or discontinuous transmission (DTX) to enable Hybrid Automatic Repeat reQuest (HARQ) to operate in each carrier. The scheme involves the steps of: performing separation of bits related to ACK, NACK, DTX for each carrier using up to 2 codewords; determining a maximum number of bits related to ACK, NACK, DTX when decoupling is not performed after a maximum number of carriers are used; and grouping the carriers such that separation between ACK, NACK, DTX of each carrier is optimized as long as the maximum number of bits is not exceeded.

10 Claims, 7 Drawing Sheets

| # of carriers | 1 | 2 | 3 | 4 | 5 |
|---|---|---|---|---|---|
| # of ACK/NACK | 1 | 2 | 3 | 4 | 5 |
| # of ACK/NACK states | 2 | $4=2^2$ | $8=2^3$ | $16=2^4$ | $32=2^5$ |
| # of bits | 1 | 2 | 3 | 4 | 5 |

Table 1: # of bits per # of ACK/NACKs

FIG. 7

| # of carriers | 1 | 2 | 3 | 4 | 5 |
|---|---|---|---|---|---|
| # of ACK/NACK | 2 | 4 | 6 | 8 | 10 |
| # of ACK/NACK states | 4 | $16=4^2$ | $64=4^3$ | $256=4^4$ | $1024=4^5$ |
| # of bits | 2 | 4 | 6 | 8 | 10 |

Table 2: # of bits per # of ACK/NACKs

FIG. 8

| # of carriers | 1 | 2 | 3 | 4 | 5 |
|---|---|---|---|---|---|
| # of ACK/NACK states (DTX included) | 3 | $9=3^2$ | $27=3^3$ | $81=3^4$ | $243=3^5$ |
| # of bits | 2 | 4 | 5 | 7 | 8 |

Table 3: # of bits per # of ACK/NACKs including DTX

FIG. 9

| # of carriers | 1 | 2 | 3 | 4 | 5 |
|---|---|---|---|---|---|
| # of ACK/NACK states (DTX included) | 5 | $25=5^2$ | $125=5^3$ | $625=5^4$ | $3125=5^5$ |
| # of bits | 3 | 5 | 7 | 10 | 12 |

Table 4: # of bits per # of ACK/NACKs including DTX

FIG. 10

| # of ACK/NACKs | 1 | 2 | 3 | 4 | 5 |
|---|---|---|---|---|---|
| SISO | 2 | 4 | 5 | 7 | 8 |
| MIMO | 3 | 5 | 7 | 10 | 12 |

Table 5: # of bits per # of ACK/NACKs including DTX

FIG. 11

| # of ACK/NACKs | 1 | 2 | 3 | 4 | 5 |
|---|---|---|---|---|---|
| SISO | 2 | 4 | 6 | 8 | 10 |
| MIMO | 3 | 6 | 9 | 12 | 15 |

Table 6: # of bits per # of fully decoupled ACK/NACKs including DTX

FIG. 12

| # of ACK/NACKs | 1 | 2 | 3 | 4 | 5 |
|---|---|---|---|---|---|
| SISO | 2 | 4 | 6 | 8 | 8 |

Table 7: # of bits per # of partially decoupled ACK/NACKs including DTX

FIG. 13

| # of ACK/NACKs | 1 | 2 | 3 | 4 | 5 |
|---|---|---|---|---|---|
| SISO | 2 | 4 | 6 | 8 | 10 |
| MIMO | 3 | 6 | 9 | 12 | 12 |

Table 8: # of bits per # of partially decoupled ACK/NACKs including DTX

FIG. 14

(A) Normal (coupled) representation (B-1) Enhanced partially decoupled representation (B-2) Enhanced partially decoupled representation

FIG. 15

(A) Normal (coupled) representation
(B-1) Enhanced partially decoupled representation
(B-2) Enhanced partially decoupled representation
(B-3) Enhanced partially decoupled representation

FIG. 16

| # of ACK/NACKs | 1 | 2 | 3 | 4 | 5 |
|---|---|---|---|---|---|
| SISO | 2 | 4 | 6 | 8 | 10 |
| MIMO | 3 | 6 | 9 | 10 | 12 |

Table 9: # of bits per # of partially decoupled ACK/NACKs including DTX

FIG. 17

ERROR PROPAGATION PROTECTION IN NON-BINARY MULTIPLE ACK/NACKS

CROSS-REFERENCE

The present disclosure claims priority benefit to the following applications, which contents are all incorporated by reference herein: U.S. Provisional Application No. 61/332,757 (filed May 8, 2010).

BACKGROUND

In the related art, certain procedures related to error decoupling for carrier aggregation techniques to support a communication system were problematic due to complicated calculations and overall processing burden. As such, the related art technologies do not sufficiently address such issues, and thus do not offer appropriate solutions.

SUMMARY

The present inventors recognized at least the above-identified drawbacks of the related art. Based upon such recognition, the various features described hereafter have been conceived such that certain procedures related to error decoupling for carrier aggregation techniques to support a communication system are more efficiently and effectively performed. In particular, to support a communication system operating with up to 2 codewords for up to 5 carriers, each carrier having one acknowledgement/negative acknowledgement (ACK/NACK) or discontinuous transmission (DTX) to enable Hybrid Automatic Repeat reQuest (HARQ) to operate in each carrier, particular grouping the carriers is performed. As a result, the desired separation between ACK, NACK, DTX of each carrier is optimized.

DETAILED DESCRIPTION

The inventive concepts and features described herein are generally explained in terms of 3GPP Long Term Evolution Advanced (LTE-A) employing multiple-input multiple-output (MIMO) technology. However, such details are not meant to limit the various features described herein, which are applicable to other types of mobile and/or wireless (radio) communication systems and methods that comply with various types of standards.

The present inventors recognized that techniques for minimizing or effectively preventing error propagation could be improved. It is important to note that such problem recognition was based upon concentrated investigation, rigorous simulations, and experimental testing conducted by the present inventors. As a result, the present inventors have provided a method of error decoupling for carrier aggregation techniques, the method comprising: performing separation of bits related to ACK, NACK, DTX for each carrier using up to 2 codewords; determining a maximum number of bits related to ACK, NACK, DTX when decoupling is not performed after a maximum number of carriers are used; and grouping the carriers such that separation between ACK, NACK, DTX of each carrier is optimized as long as the maximum number of bits is not exceeded. In particular, the concept of grouping the carriers such that separation between ACK, NACK, DTX of each carrier is optimized has never been provided or suggested in any known technique prior to the work done by the present inventors as described in this disclosure and in the priority document disclosures.

This invention proposes an enhanced method to prevent errors from propagating between multiple ACK/NACKs for multiple transmission resources.

LTE Physical Layer Overview

The techniques, methods, apparatuses, and systems described herein can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented with a radio technology such as Universal Terrestrial Radio Access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). The 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE. For clarity, this application focuses on the 3GPP LTE/LTE-A. However, technical features described herein are not limited thereto.

Figure 1:
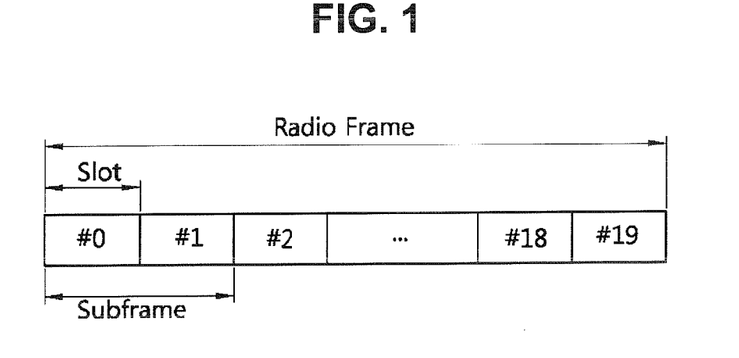
FIG. 1 shows an exemplary structure of a radio frame for 3GPP LTE technology.

FIG. 1 shows an exemplary structure of a radio frame used in 3GPP LTE. In FIG. 1, a radio frame includes 10 subframes. A subframe includes two slots in time domain. A time duration or unit for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in the time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 2:
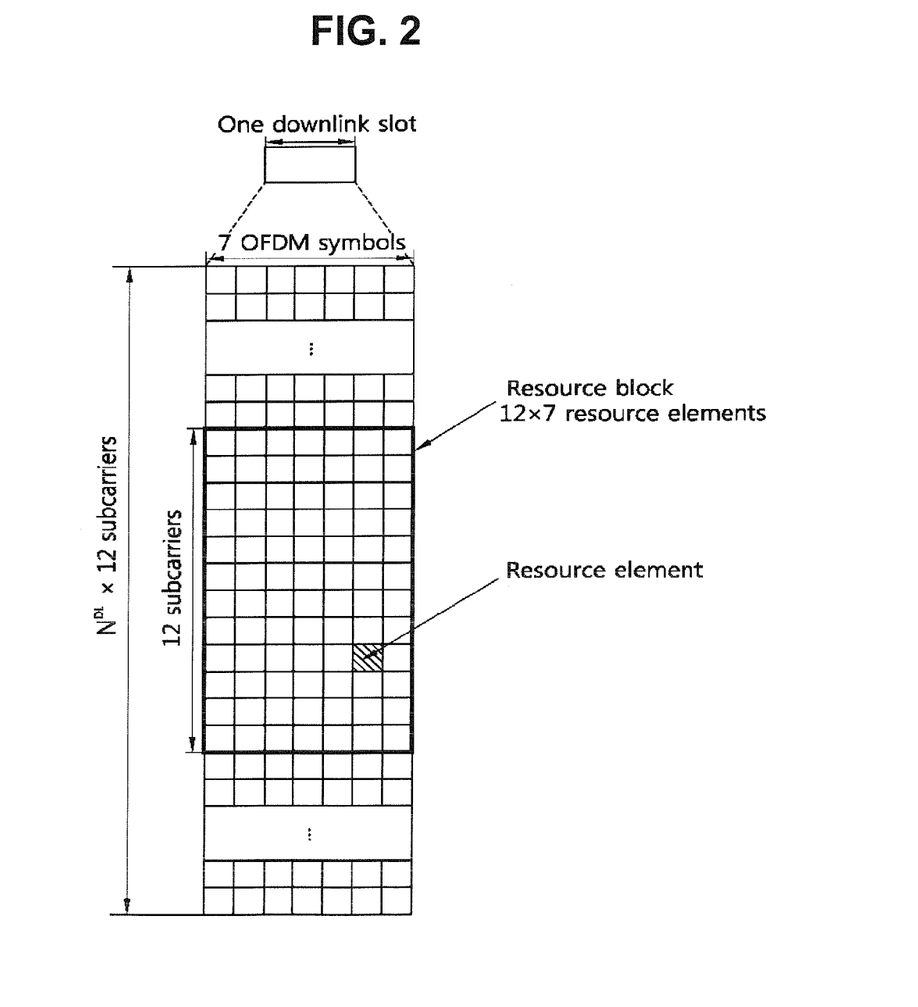
FIG. 2 shows an exemplary resource grid for one downlink slot.

FIG. 2 shows an exemplary resource grid for one downlink slot. In FIG. 2, a downlink slot includes a plurality of OFDM symbols in time domain. It is described herein that one downlink slot includes 7 OFDM symbols, and one resource block (RB) includes 12 subcarriers in frequency domain as an example. However, embodiments of the present invention are not limited thereto. Each element on the resource grid is referred to as a resource element. One RB includes 12×7 resource elements. The number NDL of RBs included in the downlink slot depends on a downlink transmit bandwidth. The structure of an uplink slot may be same as that of the downlink slot.

Figure 3:
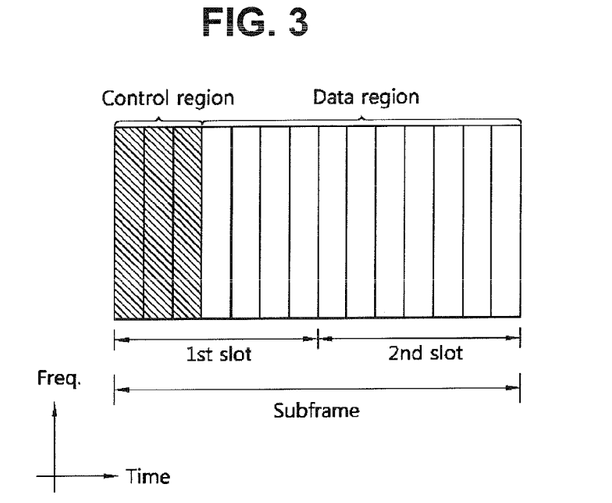
FIG. 3 shows an exemplary structure of a downlink subframe.

FIG. 3 shows an exemplary structure of a downlink subframe. In FIG. 3, a maximum of three OFDM symbols are located in a front portion of a 1st slot within a subframe correspond to a control region to be assigned with a control channel. The remaining OFDM symbols correspond to a data region to be assigned with a physical downlink shared chancel (PDSCH). Examples of downlink control channels used in the 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE (user equipment) groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs. The BS (base station) determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
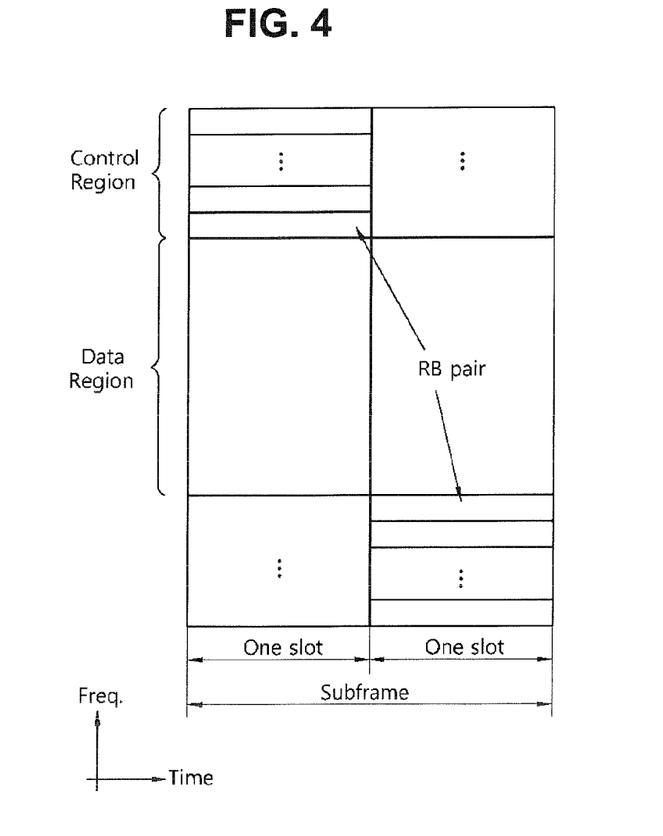
FIG. 4 shows an exemplary structure of an uplink subframe.

FIG. 4 shows an exemplary structure of an uplink frame. In FIG. 4, an uplink subframe can be divided in the frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB (radio bearer) pair in a subframe. RBs belonging to the RB pair occupy different subcarriers in respective two slots. In other words, it can be said that the RB pair allocated to the PUCCH is frequency-hopped in a slot boundary.

Figure 5:
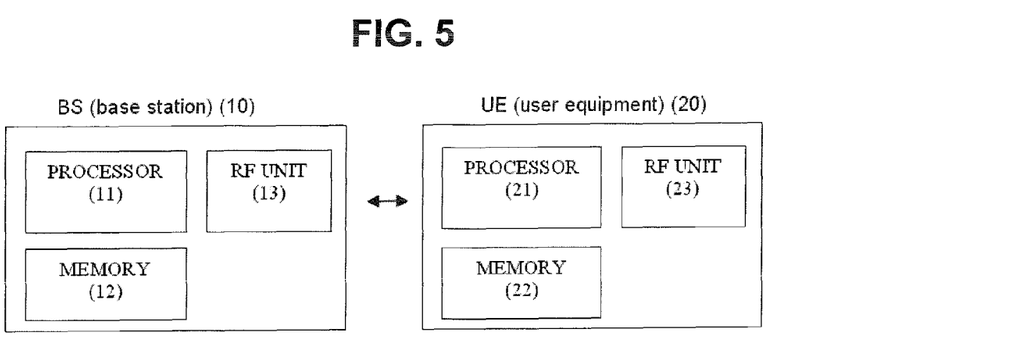
FIG. 5 shows an exemplary system for implementing certain embodiments of the invention.

FIG. 5 shows an exemplary system for implementing the embodiments described herein. In FIG. 5, a wireless communication system includes a BS (base station) 10 and one or more UE (user equipment) 20. In the downlink, a transmitter may be a part of the BS 10, and a receiver may be a part of the UE 20. In the uplink, a transmitter may be a part of the UE 20, and a receiver may be a part of the BS 10. A BS 10 may include a processor 11, a memory 12, and a radio frequency (RF) unit 13. The processor 11 may be configured to implement the proposed procedures and/or methods described herein. The memory 12 is coupled with the processor 11 and stores a variety of information for the processor 11. The RF unit 13 is coupled with the processor 11 and transmits and/or receives radio (wireless) signals. A UE 20 may include a processor 21, a memory 22, and a RF unit 23. The processor 21 may be configured to implement the proposed procedures and/or methods described herein. The memory 22 is coupled with the processor 21 and stores a variety of information for the processor 21. The RF unit 23 is coupled with the processor 21 and transmits and/or receives radio (wireless) signals. The BS 10 and/or the UE 20 may have single antenna or multiple antennas. When at least one of the BS 10 and the UE 20 has multiple antennas, the wireless communication system may be referred to as multiple input multiple output (MIMO) system.

MIMO technology uses multiple transmission (Tx) antennas and multiple reception (Rx) antennas to improve the efficiency of Tx/Rx data, whereas a previously conventional technique has generally used a single transmission (Tx) antenna and a single reception (Rx) antenna. In other words, MIMO technology allows a transmission end or reception end of a wireless communication system to use multiple antennas (hereinafter referred to as a multi-antenna), such that capacity or performance can be improved. For the convenience of description, the term "MIMO" can also be considered to be a multi-antenna technology.

In more detail, MIMO technology is not dependent on a single antenna path to receive a single total message, but instead, collects a plurality of data pieces received via several antennas in order to receive complete data. As a result, MIMO technology can increase a data transfer rate within a specific range, or can increase a system range at a specific data transfer rate.

Next-generation mobile communication technology requires a higher data transfer rate than that of a conventional mobile communication technology, so that it is expected that the effective MIMO technology is requisite for the next-generation mobile communication technology. Under this assumption, the MIMO communication technology is the next-generation mobile communication technology to be applied to mobile communication terminals or repeaters, and can extend the range of a data communication range, so that it can overcome the limited amount of transfer data of other mobile communication systems due to a variety of limited situations.

Also, MIMO technology. among a variety of technologies capable of improving the transfer efficiency of data, can greatly increase an amount of communication capacity and Tx/Rx performances without allocating additional frequencies or increasing additional power. Due to these technical advantages, most companies or developers are intensively paying attention to MIMO technology.

HARQ or Hybrid ARQ is an abbreviation of Hybrid automatic repeat request, which is one type of the ARQ (Automatic Repeat reQuest) error-control method. In ordinary ARQ, error-detection information bits are added to data to be transmitted (such as cyclic redundancy check, CRC). In HARQ, forward error correction bits are also added to the existing Error Detection bits (such as convolution codes or turbo codes). As a result, HARQ performs better than ordinary ARQ in poor signal conditions, but in its simplest form, this comes at the expense of significantly lower throughput in good signal conditions. There is typically a signal quality cross-over point below which simple HARQ is better, and above which basic ARQ is better.

HARQ can be classified into two types: Type 1 and Type 2. The simplest version of HARQ, Type I HARQ, adds both error detection and forward error correction information to each message prior to transmission. When the coded data block is received, the receiver first decodes the error-correction code. If the channel quality is good enough, all transmission errors should be correctable, and the receiver can obtain the correct data block. If the channel quality is bad, and not all transmission errors can be corrected, the receiver will detect this situation using the error-detection code, then the received coded data block is discarded and a retransmission is requested by the receiver, similar to ordinary ARQ.

As a more sophisticated form, Type II HARQ transmits only some part of error detection bits or only some part of forward error correction information and error detection bits on a given transmission, typically alternating on successive retransmissions.

To understand the difference between Type I and Type II Hybrid ARQ, consider the size of error detection and forward error correction added information: detection typically only adds a couple bytes to a message, which is only an incremental increase in length. Forward error correction, on the other hand, can often double or triple the message length with error correction parities. In terms of throughput, ordinary ARQ typically expends a few percent of channel capacity for reliable protection against error, while forward error correction ordinarily expends half or more of all channel capacity for channel improvement.

In any type of HARQ or even ordinary ARQ, a retransmission request should be fed back to the transmitter from the receiver. This request is called ACK/NACK which stands for ACKnowledgement or No ACKnowledgement. If an ACK is reported, the transmission of corresponding data is terminated and a transmission of new data will be started. On the other hand, if a NACK is fed back, the retransmission of already transmitted data is initiated. The retransmission will use of current resource for past transmitted data so that it will not increase the throughput of the system. If the reported ACK is erroneously determined to be a NACK, the successfully received data will be retransmitted resulting sacrificing the system throughput. If the reported NACK is determined to be an ACK, the new data will be transmitted so that the corresponding data will be lost and cannot be corrected until ARQ in higher level like RLC level ARQ is activated. Therefore the error rate of ACK/NACK is closely related to system performance. Namely, the ACK to NACK error rate and NACK to ACK error rate is one of key to the design of control channels in a communication system.

Hereafter, ACK/NACK with respect to LTE Advanced technology will be considered.

Figure 6:
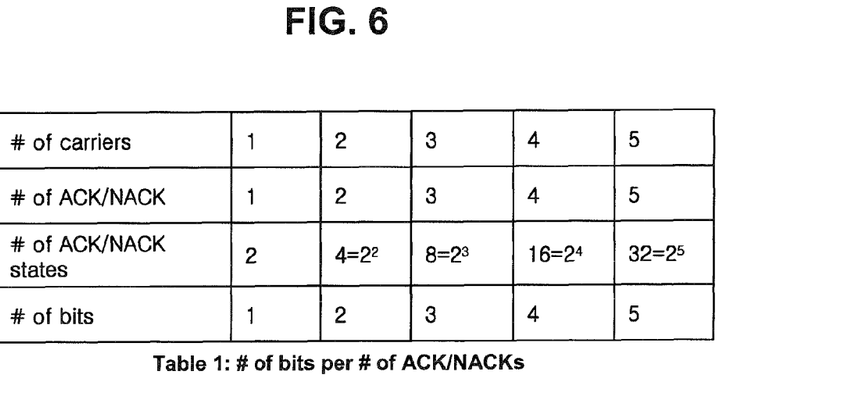
FIG. 6 shows an exemplary table for the number of bits per number of ACK/NACKs (Table 1).

Due to the increasing demand of high rate transmission over the air, LTE (Long Term Evolution) has been evolved further into LTE-A (LTE Advanced). In order to accommodate wider bandwidth while maintaining compatibility to LTE as much as possible, LTE-A has adopted the carrier aggregation techniques to support up to 100 MHz. Since the bandwidth of LTE can span up to 20 MHz, there can be up to 5 aggregated carriers in LTE-A at most. The aggregation carriers do not necessarily have to be consecutive; its configuration may have wide range of variations. In addition, HARQ techniques, which have been widely used since 3G communication systems (such as WCDMA), are also applied in each aggregated carrier. Each aggregated carrier will inevitably have one ACK/NACK to enable HARQ to operate in the carrier. One ACK/NACK has either of two states, and thus the ACK/NACKs can be represented by one bit. Therefore, the number of ACK/NACKs for LTE-A can be up to 5, which support up to 5 aggregated carriers. For example, ACK/NACK up to 5 aggregated carries can be represented as Table 1 in FIG. 6.

Figure 7:
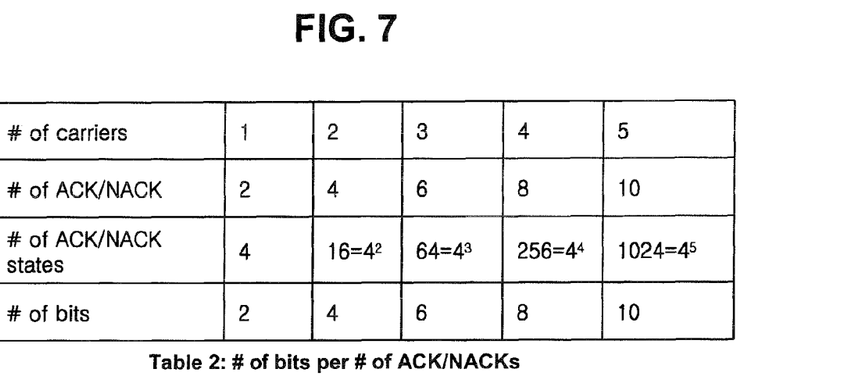
FIG. 7 shows another exemplary table for the number of bits per number of ACK/NACKs (Table 2).

The increasing demand of high data rate may be resolved by other methods than bandwidth expansion, such as MIMO. MIMO can create virtual addition dimension or stream in space domain, which results in the increase of data transmission rate. The number of streams that can be virtually created by MIMO is limited to the number of transmission antennas. For example, a MIMO system with 4 transmission antennas can produce up to 4 streams. MIMO can increase the transmission rate using the increased streams so that it may increase the number of ACK/NACK. However, the number of ACK/NACKs is decided by the number of the codewords transmitted through the MIMO system. Here, the number of codewords can be different than the number of streams. For example, LTE has up to 2 codewords even if the number of streams can be extended up to 4, by using 4 transmission antennas; LTE has 2 ACK/NACKs for 2 codewords while 1 ACK/NACK for 1 codeword. If the number of codewords in LTE-A is assumed to be 2, the same as that of LTE, then LTE-A has up to 2 ACK/NACKs per each carrier. The 2 ACK/NACKs has 4 states, namely, (ACK,ACK), (ACK, NACK), (NACK,ACK) or (NACK,NACK), in which the 1st ACK/NACK in parentheses corresponds to the ACK/NACK of 1st codeword, and the 2nd ACK/NACK to the 2nd codeword, respectively; and thus the 2 ACK/NACKs can be represented by 2 bits. Taking into consideration the carrier aggregation, the number of ACK/NACKs of MIMO in LTE-A can be represented as Table 2 in FIG. 7.

The aggregation of carriers can be done in a non-continuous manner; for example, among 5 candidate carriers, 3 carriers could be aggregated using the 1st, 2nd and 5th carriers. On top of that, even though some number of carriers may be set to be aggregated, the actual number of carriers may be less than such set number. For instance, even if 3 carriers are aggregated in the system, the actual number of used carriers could be 1 or 2. If the number of carriers used at a time is lower than the maximum number of aggregated carriers, some carriers are not be used at a given time, it may be beneficial to report which carriers are not used. To indicate the carriers that are not used temporarily, the DTX (discontinuous transmission) mark can be considered in the feedback. A DTX can be incorporated into ACK/NACK transmission scheme such that a DTX can confirm the corresponding carrier is not used at given time. Since DTX and ACK/NACK are mutually exclusive, if the DTX indication is introduced in ACK/NACK transmission, the number of states of ACK/NACK is increased by one.

Figure 8:
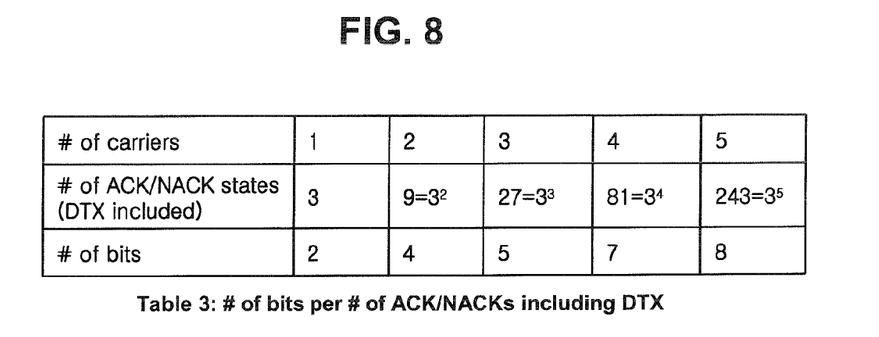
FIG. 8 shows an exemplary table for the number of bits per number of ACK/NACKs including DTX (Table 3).

Therefore, in non-MIMO mode (such as SISO: single-input single-output), the number of ACK/NACK states increase from 2 to 3 as per Table 3 shown in FIG. 8. In FIG. 8 (Table 3), it can be understood that the required number of bits is also enlarged to accommodate the increased states. In this disclosure, it is assumed the DTX transmission is incorporated into the ACK/NACK channel(s). Hereinafter, an ACK/NACK that includes a DTX transmission can be simply denoted by ACK/NACK.

Figure 9:
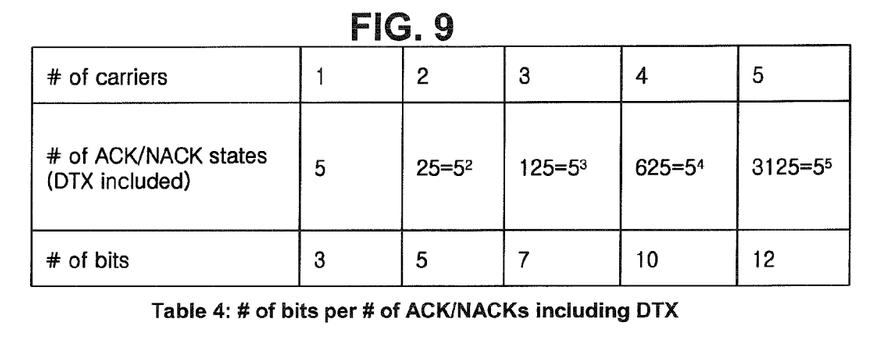
FIG. 9 shows another exemplary table for the number of bits per number of ACK/NACKs including DTX (Table 4).

If DTX is introduced in MIMO mode with 2 codewords, the number of states of ACK/NACK will increase from 4 to 5 as per Table 4 in FIG. 9.

Hereafter, the error properties of ACK/NACKs with DTX will be explained.

ACK/NACKs without DTX have states of a multiple of 2; each ACK/NACK can be independently represented by some amount of bits. In a non-MIMO case, each ACK/NACK bit is denoted by one bit; while for the n-codewords case, the ACK/NACK will be expressed by n bits. It should be noted that there is no waste in transformation of ACK/NACK without DTX into bits. Since each ACK/NACK is separately encoded, one error among multiple ACK/NACKs has no effect on other ACK/NACKs, which does not propagate error. For example, if 3 ACK/NACKs are assumed and the 3rd ACK/NACK is erroneously received, then the error resides only in the 2nd ACK/NACK; as the 1st and 3rd ACK/NACKs will be correctly received.

On the other hand, ACK/NACKs with DTX do not have states that are multiples of 2, which brings about difficulty in mapping ACK/NACKs into binary bits. Since ACK/NACKs with DTX is non-binary, if each ACK/NACK is represented by a minimum number of bits, then the bits in its binary representation have to be closely interrelated.

To be more specific, let us consider the same example in ACK/NACK without DTX; the details are as follows:

3 ACK/NACKS in non-MIMO mode with $3^3$ states
Notation: ACK=0, NACK=1, DTX=2
Transmitted using 5 bits For example, (1st A/N, 2nd A/N, 3rd A/N)=(NACK, ACK, DTX) is transmitted As a ternary representation, the transmission is (1,0,2)= (NACK, ACK, DTX) and the corresponding decimal number is 19 ($=2*3^2+0*3^1+1*3^0$).

As a binary conversion, the actual transmission is (1,0,0,1, 1) since 19 can be decomposed into $19=1*2^4+0*2^3+0*2^2+1*2^1+1*2^0$ in a binary expression.

Received erroneously in 2nd bit in the ACK/NACK

As a binary representation, the error occurs in the 2nd bit as in (1,0,0,0,1) and the corresponding decimal number is $17=1*2^4+0*2^3+0*2^2+0*2^1+1*2^0$.

As a ternary conversion, the decision is (2,2,1)=(DTX, DTX, ACK) since 17 can be decamped into 17 ($=1*3^2+2*3^1+2*3^0$) which results in all 3 ACK/NACK errors due to 1 bit error in the reception.

From the example above, it can be understood that only a one-bit error in the binary representation can cause more than one ACK/NACK errors. Usually, a one-bit error will be limited into one ACK/NACK error in binary representation, but this is not true in the non-binary case. This is called error propagation and the reason for this is because the non-binary is converted into binary in a compact way using minimum number of bits.

Hereafter, the error decoupling of ACK/NACKs with DTX will be explained.

In order to prevent an error in one ACK/NACK from being propagated into other ACK/NACKs, decoupled mapping can be considered. For example, if 5 ACK/NACKs with DTX are assumed, then its required number of bits can be summarized as per Table 5 shown in FIG. 10.

Figure 10:
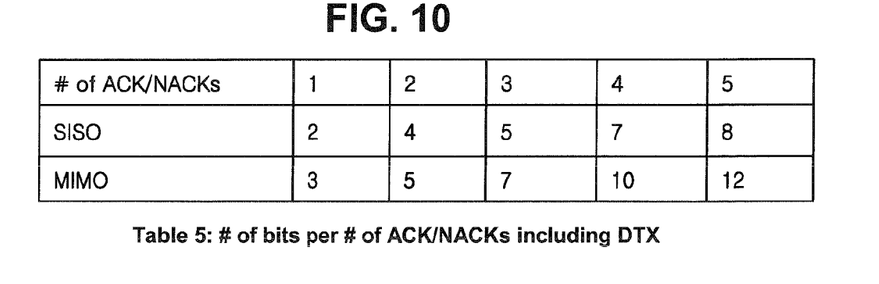
FIG. 10 shows an exemplary table for the number of bits per number of ACK/NACKs including DTX with respect to SISO and MIMO (Table 5).

If every ACK/NACK in Table 5 is independently assigned by 2 bits in SISO or 3 bits in MIMO as in Table 6 (of FIG. 11), then a single bit error has an effect on only a single ACK/NACK, and the error does not propagate into other ACK/NACKs. It should be noted that the number of bits for multiple ACK/NACKs are a multiple of the number of bits for a single ACK/NACK.

Figure 11:
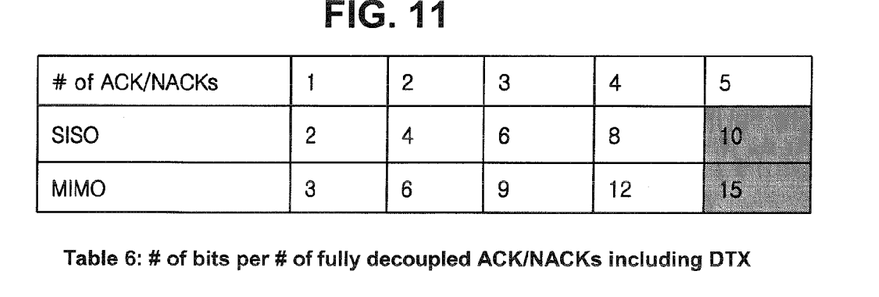
FIG. 11 shows an exemplary table for the number of bits per number of fully decoupled ACK/NACKs including DTX with respect to SISO and MIMO (Table 6).

Assigning a multiple of number of bits for a single ACK/NACK makes each ACK/NACK uncorrelated to each other. However, the number of bits for multiple ACK/NACKs may be over the maximum number of bits in ordinary ACK/NACK representation. For example, the number of bits for 5 ACK/NACKs in Table 6 is 10 or 15, which is way over the maximum number of 8 or 12 in Table 5. The number of bits for 1, 2, 3 or 4 are also increased compared to the original number of bits, but such will not be problem since those are less than the original maximum number.

Figure 12:
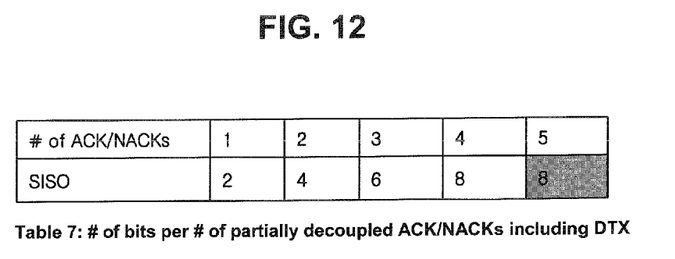
FIG. 12 shows an exemplary table for the number of bits per number of partially decoupled ACK/NACKs including DTX with respect to SISO (Table 7).

If the system is locked to operate in non-MIMO mode (e.g. SISO mode), then its actual maximum number is 8, and then the 5 ACK/NACKs cannot help but use the normal representation upon giving up the decoupling, as shown in Table 7 of FIG. 12.

If the system is fully operable in MIMO mode, the SISO mode can be considered as a subset of MIMO mode, such that the actual maximum number of bits should be 12, and not 10. Taking into consideration of the maximum number of bits, only 5 ACK/NACKs with DTX in MIMO mode will be not represented in a decoupled way, but represented in a normal way. The other ACK/NACKs can be denoted by decoupled representation. This is summarized in Table 8 as shown in FIG. 13.

Figure 13:
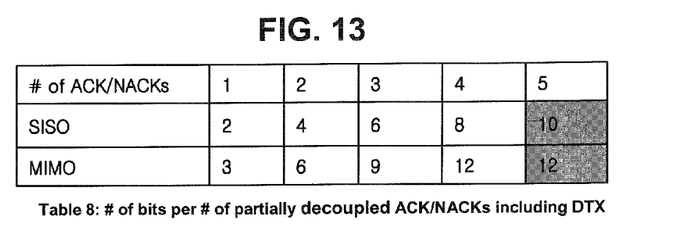
FIG. 13 shows an exemplary table for the number of bits per number of partially decoupled ACK/NACKs including DTX with respect to SISO and MIMO (Table 8).

An enhancement can be considered in the 5 ACK/NACK, which adopts the ordinary representation in Table 8 (FIG. 13). If decoupling is done in a group-wise manner, like decoupling between two ACK/NACKs and another two ACK/NACKs, then partial enhancement in decoupling could be achieved.

Figure 14:
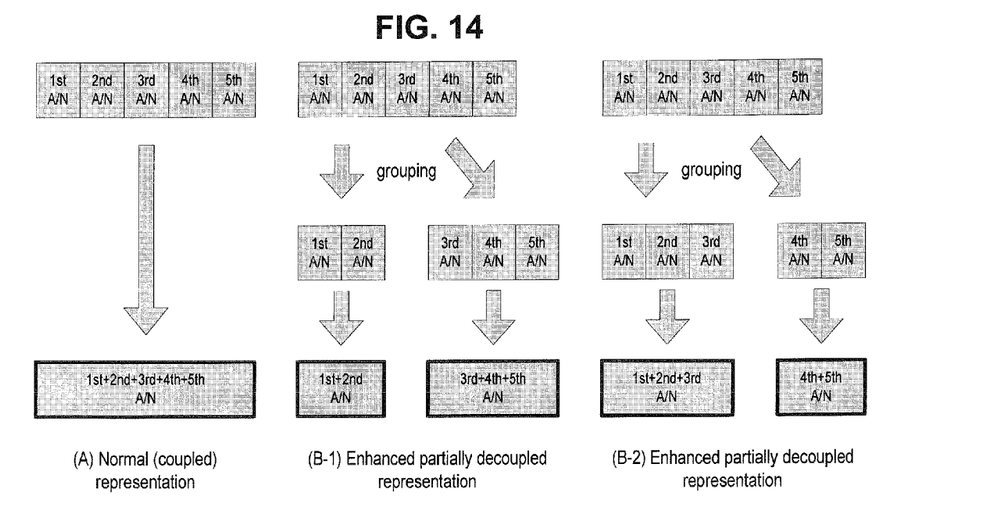
FIG. 14 shows some exemplary concepts related to an enhanced partially decoupled representation.

Since 2 ACK/NACKs with DTX can be represented by 5 bits and 3 ACK/NACKs with DTX by 7 bits, the 5 ACK/NACKs with DTX can be decomposed into two groups; 5 bits for 2 ACK/NACKs and 7 bits for 3 ACK/NACKs as in FIG. 14. Even though the ACK/NACK is not fully decoupled, an error in one group will not be transferred into another group. In FIG. 14, the grouping is done in the order of 2 ACK/NACKs and 3 ACK/NACKs, however another grouping with reverse order of 3 ACK/NACKs and 2 ACK/NACKs could be also applied.

Figure 15:
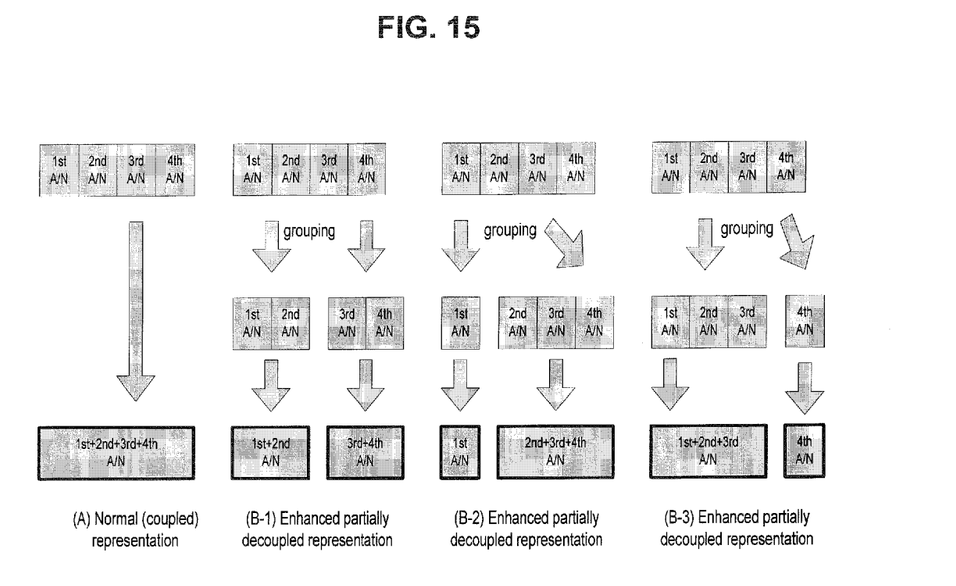
FIG. 15 shows some exemplary concepts related to a further enhanced partially decoupled representation.
Figure 16:
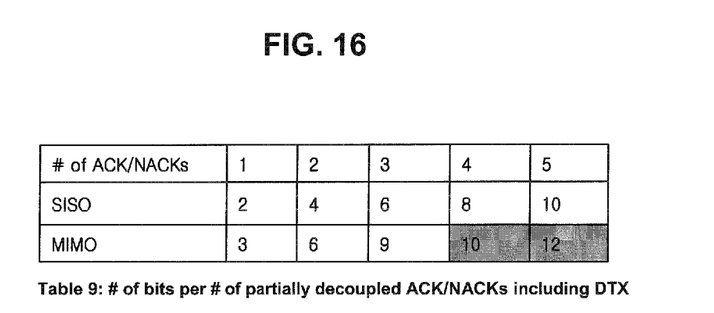
FIG. 16 shows an exemplary table for the number of bits per number of partially decoupled ACK/NACKs including DTX with respect to SISO and MIMO (Table 9).

In Table 8 and FIG. 14, the 5 ACK/NACKs with DTX in MIMO mode occupies 12 bits and cannot be differentiated with 4 ACK/NACKs which may cause some problem in the receiver side. In order to make the number of bits for the 4 ACK/NACKs and 5 ACK/NACKs to be different from each other, the representation of 4 ACK/NACKs can be modified. For example, the 4 ACK/NACKs can be decomposed into two groups; 1 ACK/NACK and 3 ACK/NACKs or 2 ACK/NACKs and 2 ACK/NACKs. This modification in the 4 ACK/NACKs results in 10 bits in binary representation, which makes the number of bits different from that of the 5 ACK/NACKs as in FIG. 15. The number of bits in further enhancement is also shown in Table 9 of FIG. 16.

Figure 17:
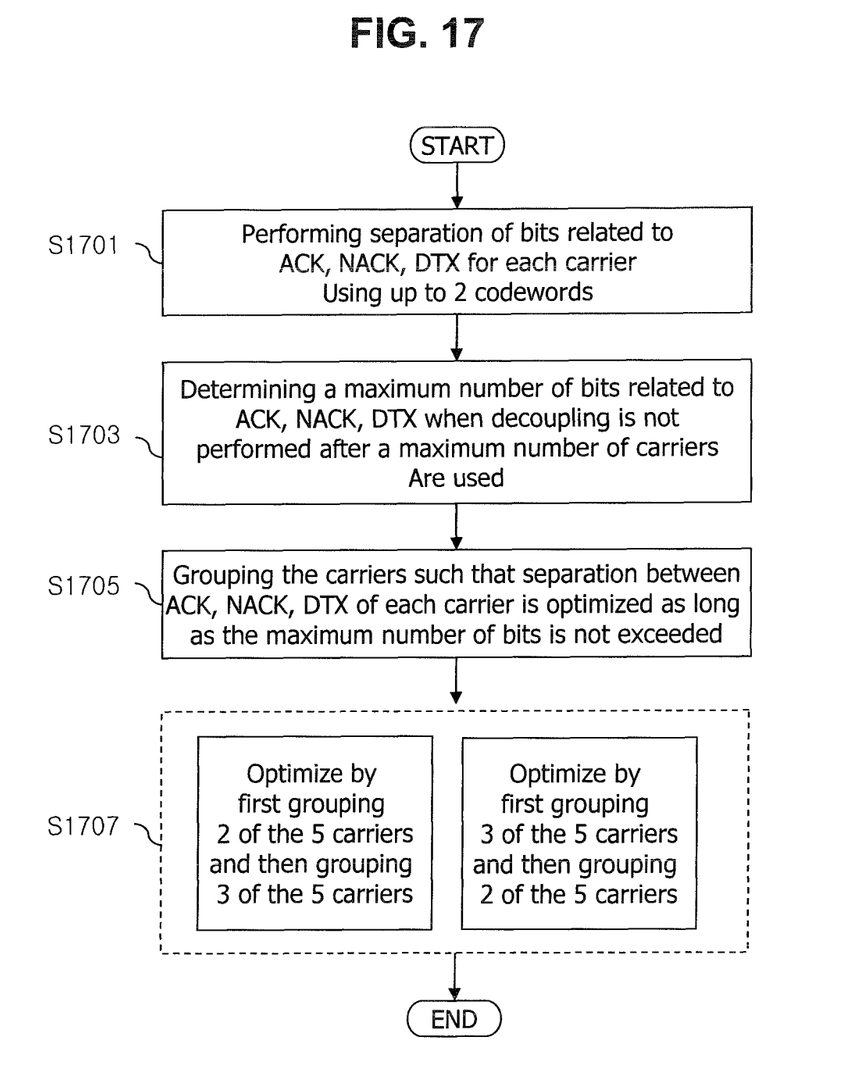
FIG. 17 shows an exemplary flowchart related to the grouping of carriers.

To sum up, the various inventive concepts and features of the present disclosure can be described in the following manner:

Referring to FIG. 17, the present disclosure provides a method of error decoupling for carrier aggregation techniques, the method comprising: performing (S1701) separation of bits related to ACK, NACK, DTX for each carrier using up to 2 codewords; determining (S1703) a maximum number of bits related to ACK, NACK, DTX when decoupling is not performed after a maximum number of carriers are used; and grouping (S1705) the carriers such that separation between ACK, NACK, DTX of each carrier is optimized as long as the maximum number of bits is not exceeded.

Also, the performing, determining, and grouping steps are related to error decoupling for carrier aggregation techniques to support a communication system operating with 2 codewords for up to 5 carriers, each carrier having one acknowledgement/negative acknowledgement (ACK/NACK) or discontinuous transmission (DTX) to enable Hybrid Automatic Repeat reQuest (HARQ) to operate in each carrier. Also, each carrier is optimized by first grouping 2 of the 5 carriers and then grouping 3 of the 5 carriers (S1707). Alternatively, each carrier is optimized by first grouping 3 of the 5 carriers and then grouping 2 of the 5 carriers (S1707). It should be noted that the error decoupling involves at least one of decoupled mapping and enhanced partial decoupling. Also, the performing step, the determining step, and the grouping step are performed for Multiple Input Multiple Output (MIMO) situations.

The present disclosure also provides an apparatus for error decoupling for carrier aggregation techniques, the apparatus comprising: a radio frequency unit configured to send and receive signals and information; a memory configured to store information related to the carrier aggregation techniques based on the signals and information sent and received via the radio frequency unit; and a processor configured to cooperate with the radio frequency unit and the memory in order to, perform separation of bits related to ACK, NACK, DTX for each carrier using up to 2 codewords, determine a maximum number of bits related to ACK, NACK, DTX when decoupling is not performed after a maximum number of carriers are used, and group the carriers such that separation between ACK, NACK, DTX of each carrier is optimized as long as the maximum number of bits is not exceeded.

The performing, determining, and grouping steps executed by the processor are related to error decoupling for carrier aggregation techniques to support a communication system operating with up to 2 codewords for up to 5 carriers, each codeword of each carrier having one acknowledgement/negative acknowledgement (ACK/NACK) or discontinuous transmission (DTX) to enable Hybrid Automatic Repeat reQuest (HARQ) to operate in each carrier. Also, each carrier is optimized by first grouping 2 of the 5 carriers and then grouping 3 of the 5 carriers. Alternatively, each carrier is optimized by first grouping 3 of the 5 carriers and then grouping 2 of the 5 carriers. It should be noted that the error decoupling involves at least one of decoupled mapping and enhanced partial decoupling. Also, the performing step, the determining step, and the grouping step are performed by the processor for Multiple Input Multiple Output (MIMO) situations.

Also, referring back to FIG. 5, the present disclosure also provides an apparatus (e.g., device having appropriate hardware components such as a processing unit, controller, CPU, microprocessor(s), memory or storage, etc. that access and execute corresponding software code) that is able to implement and carry out the above-described method.

The various features and concepts described herein may be implemented in software, hardware, or a combination thereof. For example, a computer program (that is executed by a processor, controller, CPU, etc. in a computer, a mobile terminal and/or a network device) that implements a method and apparatus for employing error decoupling for carrier aggregation techniques to support a communication system may be comprised of one or more program code sections or modules for performing various tasks. Similarly, a software tool (that is executed by a processor, controller, CPU, etc. in a computer, a mobile terminal and/or a network device) for a method and apparatus for employing error decoupling for carrier aggregation techniques to support a communication system may comprise program code sections or modules that are executed by a processor (or other controller such as a CPU) for performing various tasks.

The method and apparatus for employing error decoupling for carrier aggregation techniques to support a communication system are compatible with various types of technologies and standards. Certain concepts described herein are related to particular standards, such as 3GPP (LTE, LTE-Advanced, etc.), IEEE, 4G GSM, WCDMA, and the like. However, it can be understood that the above exemplary standards are not intended to be limited, as other related standards and technologies would also be applicable to the various features and concepts described herein.

INDUSTRIAL APPLICABILITY

The features and concepts herein are applicable to and can be implemented in various types of user devices (e.g., mobile terminals, handsets, wireless communication devices, etc.) and/or network devices, entities, components, etc. that can be configured to support error decoupling for carrier aggregation techniques to support a communication system.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

What is claimed is:

1. A method for error decoupling of feedback data in a wireless access system supporting a carrier aggregation and a Multiple-Input Multiple-Output (MIMO), the method being performed by a mobile station and comprising:
   receiving downlink data through carriers from a base station;
   determining feedback states indicating one of an acknowledgement (ACK), a negative acknowledgement (NACK), and a discontinuous transmission (DTX) for each of the carriers in response to the downlink data;
   grouping the feedback states of the carriers into two or more groups;
   encoding the grouped feedback states into feedback data in binary per each of the two or more groups for partially decoupling the feedback states; and
   transmitting the feedback data to the base station,
   wherein each of the carriers uses up to 2 codewords for the MIMO, and the feedback states indicate one of an ACK of a first codeword, a NACK of the first codeword, an ACK of a second codeword, a NACK of the second codeword, and the DTX, and
   wherein a number of bits in the feedback data of 5 carriers is different from a number of bits in the feedback data of 4 carriers.

2. The method of claim 1, wherein each of the carriers is grouped by first grouping 3 of 5 carriers and then grouping 2 of the 5 carriers.

3. The method of claim 1, wherein each of the carriers is grouped by first grouping 2 of 5 carriers and then grouping 3 of the 5 carriers.

4. The method of claim 2, wherein the encoding step involves at least decoupled mapping and enhanced partial decoupling.

5. The method of claim 1, wherein the feedback data corresponding to one of the two or more groups indicates all of the grouped feedback states of the one group.

6. An apparatus for error decoupling of feedback data in a wireless access system supporting a carrier aggregation and a Multiple-Input Multiple-Output (MIMO), the apparatus comprising:
   a radio frequency unit configured to send and receive signals and information;
   a memory configured to store data related to the carrier aggregation techniques based on the signals and information sent and received via the radio frequency unit; and
   a processor configured to cooperate with the radio frequency unit and the memory in order to:
   receive downlink data through carriers from a base station,
   determine feedback states including one of an acknowledgement (ACK), a negative acknowledgement (NACK), and a discontinuous transmission (DTX) for each of the carriers in response to the downlink data,
   group the feedback states of the carriers into two or more groups,
   encode the feedback states of one of the two or more groups into partially coupled feedback data in binary per each of the two or more groups, the partially coupled feedback data indicating all of the feedback states of the one group, and
   transmit the group feedback data to the base station,
   wherein each of the carriers uses up to 2 codewords for the MIMO, and the feedback states indicate one of an ACK of a first codeword, a NACK of the first codeword, an ACK of a second codeword, a NACK of the second codeword, and the DTX, and
   wherein a number of bits in the feedback data of 5 carriers is different from a number of bits in feedback data of 4 carriers.

7. The apparatus of claim 1, wherein each of the carriers is grouped by first grouping 2 of 5 carriers and then grouping 3 of the 5 carriers.

8. The apparatus of claim 1, wherein each of the carriers is grouped by first grouping 3 of 5 carriers and then grouping 2 of the 5 carriers.

9. The apparatus of claim 1, wherein when the processor encodes the feedback states, the encoding involves at least one of decoupled mapping and enhanced partial decoupling.

10. The apparatus of claim 6, wherein the feedback data corresponding to one of the two or more groups indicates all of the grouped feedback states of the one group.

* * * * *